J. T. SIMPSON & P. B. TAYLOR.
INTERNAL COMBUSTION ENGINE.
APPLICATION FILED MAR. 1, 1912.
1,151,128.
Patented Aug. 24, 1915.
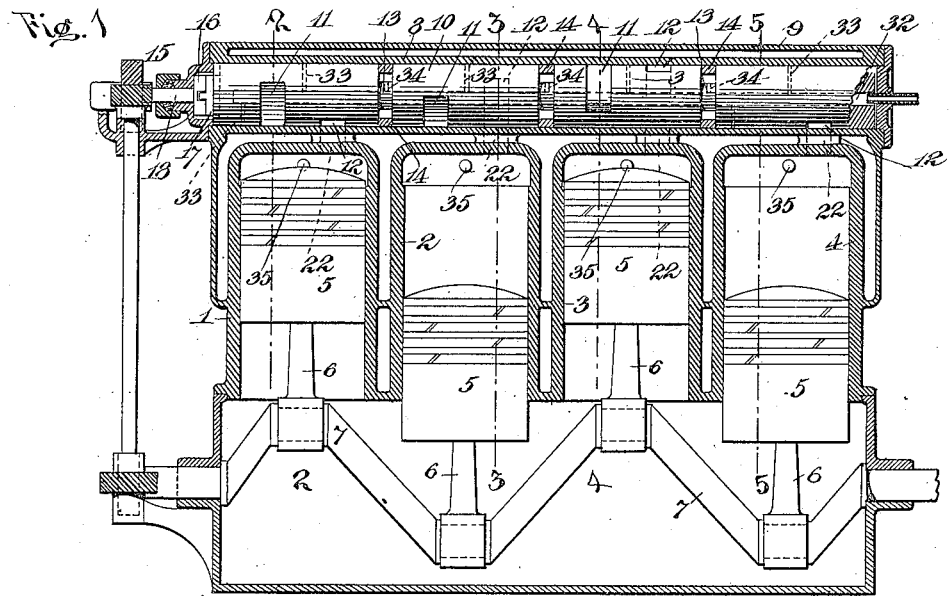
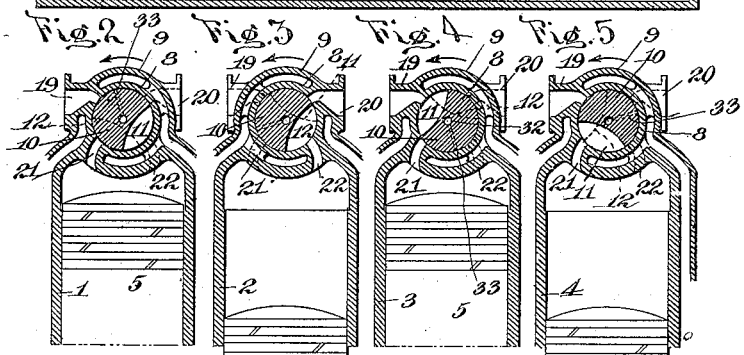
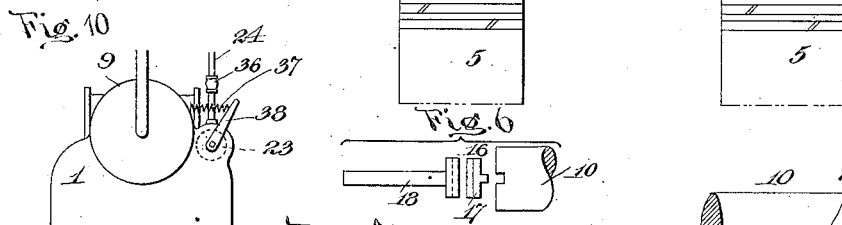
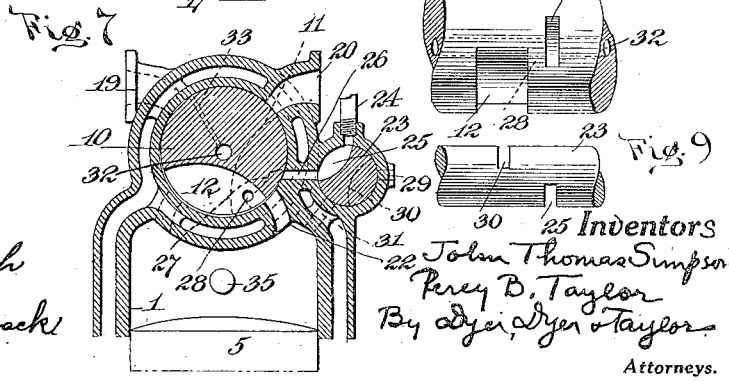

UNITED STATES PATENT OFFICE.

JOHN THOMAS SIMPSON AND PERCY B. TAYLOR, OF NEWARK, NEW JERSEY.

INTERNAL-COMBUSTION ENGINE.

1,151,128.  Specification of Letters Patent.  Patented Aug. 24, 1915.

Application filed March 1, 1912.  Serial No. 680,896.

*To all whom it may concern:*

Be it known that we, JOHN THOMAS SIMPSON and PERCY B. TAYLOR, both citizens of the United States, and both residents of Newark, in the county of Essex and State of New Jersey, have invented a new and useful Internal-Combustion Engine, of which the following is a specification.

The objects we have in view are to produce an internal combustion engine which will eliminate the use of puppet or other make and break contact valves, and of the cams by means of which they are moved.

According to our invention, we use a single main rotating valve which is in continuous contact with the valve seat, thereby obtaining noiseless operation. At the same time, we eliminate a great number of the parts, and thereby simplify and cheapen the engine. Also, according to our invention, the rotating valve is unsupported by the driving spindle, and is free to move in any radial direction regardless of the necessarily central position of the driving spindle. This allows of the valve being considerably smaller in diameter than the bore of the valve casing so that the proper lubrication of the valve surface is secured and an allowance is made for expansion of the valve by heat. It also allows less refinement in fitting the valve, which has been one of the chief objections to rotating valves heretofore. According to our invention, the seats of the valve are kept clean at all times, so that we avoid the necessity of cleaning the valve, and the rotating valve is of such a form that it is in itself very much stronger than the valves heretofore used, and danger of breaking is reduced to a minimum. We make the ports in the valve so that there is no possibility of disarrangement of relative timing of the opening of the valve to the various cylinders, and no adjustment is required after the first setting.

A further object is to provide a self-starting device for the engine, by means of compressed air or other gas. This self-starting device is combined with the rotating valve, and by our invention we avoid the use of any distributing valves in addition.

A further object is to produce a device which will permit free inlets and outlets of air to the cylinders of the engine, for when the latter is not being operated but is being turned, it will be free to turn without drag; this latter is of particular value in aeroplane engines.

A further object is to improve the lubrication of the valve.

These and further objects will more fully appear from the following specification and accompanying drawings, considered together or separately:

In the drawings, Figure 1 represents a view of an engine embodying our invention, the view being taken through the four cylinders, the valve being partly in section. Fig. 2 is a section on the line 2—2 of Fig. 1. Fig. 3 is a section on the line 3—3 of Fig. 1. Fig. 4 is a section on the line 4—4 of Fig. 1. Fig. 5 is a section on the line 5—5 of Fig. 1. Fig. 6 is a view of the sliding plate joint, with the parts separated. Fig. 7 is a view similar to that of Fig. 2, on an enlarged scale, showing the self-starting valve, this valve being omitted in the preceding views, to avoid confusion. Fig. 8 is a portion of the main valve, showing one of the exhaust ports and the connected starting port. Fig. 9 is a portion of the starting valve showing the inlet and outlet ports, and Fig. 10 is a detail of the starting valve.

In all of the views, like parts are designated by the same reference characters.

We illustrate our invention as applied to an internal combustion engine of the four cylinder, 4-stroke cycle type. The invention, however, may be employed in connection with other forms of internal combustion engines. According to the apparatus illustrated in the drawings, the cylinders 1, 2, 3 and 4, are suitably supported with relation to one another. Each has the usual piston 5. Each piston is attached to a connecting rod 6, and the connecting rods are attached to the crank shaft 7, all in the usual manner. The valve casing 8 is cylindrical in cross-section as shown, and is connected with all of the cylinders. We prefer to locate it in the position shown, above the cylinders, but this position is not essential, as it may be located elsewhere. The valve casing is provided with a cooling device, shown in the drawings as a water jacket 9. This jacket may inclose the whole of the valve casing, as shown, or only a part of it, as desired. The main valve 10 is located within the valve casing; it is circular in cross-section, and is provided with the necessary inlet ports 11, and outlet ports 12, as will be described. An inlet and an outlet port are arranged in conjunction with each cylinder. These ports are sufficiently separated to prevent leakage from one to the other.

The valve may be made solid, as shown, but this is not essential, as it may be made in the form of a shell of sufficient thickness to give the necessary strength. We prefer to make it of a single piece, the portions carrying the ports of the full size of the valve, and these portions connected together by the reduced portions 13. These reduced portions are between the cylinders, and by means of them, the valve is given a certain degree of flexibility, and it will not be distorted by heat, these reduced portions permitting bending. At each reduced portion is located an expanding ring 14. This ring is of the usual expanding type, and makes a close fit with the valve at its sides and with the valve casing at its periphery. These rings are put in loose, but being made to spring outward, will engage in close relation with the inner wall of the valve casing and ordinarily will not rotate.

The valve is rotated by suitable gearing 15, of any type, so that it will have the proper speed relation to the crank shaft 7. We connect the gearing 15 to the valve by means of a suitable device to permit relative movement of the valve. This device is preferably the sliding plate coupling 16, which comprises a plate 17 (see Fig. 6) with a feather on each side, the two feathers being at right angles to each other. One feather plays in a groove in the end of the valve, and the other feather plays in a groove on the face of an enlarged head carried by the shaft 18 to which the gearing 15 is connected. This coupling permits the valve to adjust itself to irregularities in the casing, and also accommodates itself to the changes in shape caused by wear, and the valve, therefore, floats in its casing free from any centralizing influence of the shaft 18.

In connection with each cylinder is a gas inlet passage 19, in the valve casing, and an exhaust passage 20 from the valve casing. There is also a gas passage 21, leading from the valve through the casing to the cylinder, and an exhaust passage 22 leading from the cylinder through the casing to the valve.

The operation of so much of the invention as has been described, is as follows: Assuming that the engine is of the 4-stroke cycle type shown, and has the four cylinders,—Fig. 2 shows the position of the valve and piston just as the latter is about to descend after the charge has been exploded. Fig. 3 represents the position of the piston and the valve on the upstroke of the piston while the products of combustion are being discharged. Fig. 4 represents the position of the piston and the valve when the piston is about to descend, during the suction stroke, drawing in the mixture into the combustion chamber, and Fig. 5 shows the position of the piston and the valve during the beginning of the compression stroke. These Figs. 2, 3, 4 and 5, represent the sequence of movement in any cylinder, or where the cranks are arranged as in Fig. 1, so that the operations in the cylinders 1, 2, 3 and 4 are in sequence, then these views will represent the separate cylinders 1, 2, 3 and 4. In Figs. 2, 4 and 5, the inlet port 11 is shown in solid lines, and the exhaust port in broken lines. In Fig. 3, the exhaust port is shown in full lines, and the inlet port in broken lines. Assuming the ports to be as in Fig. 2, and ignition having taken place, the crank being just on center, the valve having rotated in the direction of the arrow at the rate of one-half the speed of the crank shaft,—all the ports will be closed. As the piston descends to the bottom of the stroke, the valve will be given a one-quarter of a revolution, bringing the parts to the position shown in Fig. 3. The outlet port 12 has registered with the exhaust passage 22 from the cylinder and is about to register with the exhaust passage 20 from the valve casing, the piston rising, will eject the products of combustion through these two passages by way of the exhaust port 12. In the position shown in Fig. 4, the piston has reached the top of its stroke and the valve has been given a further one-quarter revolution. The further rotation of the valve will bring the inlet port 11 in communication with the gas passage 19, and gas passage 21, and on the further rotation of the engine, accompanied by the movement of the piston downward, the charge will be drawn in through these passages and by way of this port. When the piston reaches the position shown in Fig. 5, and is about to ascend, the exhaust passage will be closed, the inlet port 11,—while it will be in communication with the gas passage 21, will no longer be in communication with the gas inlet passage 19, hence the charge will be compressed by the upward movement of the piston. We prefer to have the ignition so timed that the cylinders will fire just before the piston reaches the top of its stroke and the crank is beyond its center; but, of course, it may take place before or after this point. The contents of the inlet port will be carried around by the valve, and will be ejaculated into the inlet manifold. The outlet port will communicate with the outlet passage 22, during the firing stroke, hence the area of this port must be calculated as part of the effective area of the combustion chamber.

It is apparent that the passages 19 and 20 being above the horizontal center of the valve, all pressure, that is,—during compression and expansion—will be upward, tending to force this valve against the upper part of its seat and keep the passages closed. Even should the valve wear to a smaller size, and should the valve casing wear larger, these passages will always be kept closed by the engagement of the valve with them. Ordinarily, it will be immaterial if any leakage should occur between the inlet port and the outlet port of that portion of the valve above each cylinder, because the inlet and outlet ports will be subjected to the same pressure at the same time.

The starting device is as follows; reference being had particularly to Fig. 7: We provide a hand-starting valve 23. This hand valve is preferably used in connection with a plurality of cylinders. When used in connection with four cylinders, it will always insure starting of the engine, irrespective of the position of the pistons. The hand valve is in the form of a cylinder somewhat similar to the valve already described, mounted in a suitable casing as shown. To this casing is attached a pipe formed with a passage 24, for air or other gas under pressure. This passage is brought into communication with the port 25 in the starting valve when the valve is rotated to the proper position. When so brought into position, it communicates with the port 26 in the valve casing, and this port 26 communicates with the port 27 in the main valve 10. This port 27 is to one side of the exhaust port 12, and is connected to the same by means of a by-pass 28. It is apparent that by rotating the starting valve as by means of the lever 38, so that these ports are brought into coincidence, air or gas under pressure will enter the particular port 27 that is opposite the passage 26. This port 27 is so located in relation to the outlet port 12, that it will be opposite the passage 26 when the piston is just beyond the firing position and is about to descend, and will remain in such position during the firing stroke only of the piston. The port 27 is located to one side of the outlet port 12, and extends further around the valve so that it will be open as soon as the outlet port is in communication with the exhaust passage 22. The air or gas under pressure, therefore, will enter the cylinder through the outlet passage; the inlet passage 21 at the same time will be closed, as shown in Fig. 7. The engine, therefore, is started by air or gas entering the exhaust port of the main valve. The movement of this main valve will determine the proper timing of inlet and cut-off. A check valve 36 may be placed in the air supply pipe, as shown, so that if the valve is not closed after starting, the products of combustion will not be driven back through this pipe. We prefer to use a spring 37, for keeping the valve normally closed (see Fig. 10), so that when the operator removes his hand or foot from the valve, after the engine has started, the valve will automatically close.

For the purpose of allowing the engine to run free, for instance, when used in aeroplane work, when the engine is being rotated by the propeller, we provide the following device: The starting valve casing is provided with an outlet passage 29. This outlet passage may be brought into juxtaposition with an outlet port 30, formed in the starting valve. At the same time, the outlet port 30 will be brought into juxtaposition with the port 31 which is connected to the cylinder. These ports are brought into coincidence by rotation of the starting valve, in the opposite direction from that used in starting, so that the port 25 is no longer in communication with the passage 26. Air, therefore, outside will be freely drawn into and forced out of the cylinder by the movement of the piston; and there will be no load upon the engine and no resistance to turning will be imposed.

The valve of the engine is preferably lubricated in the following manner: The valve is provided with an oil passage 32, extending to a source of lubricant. This oil passage is provided with branches 33, extending to the outside of the valve. The lubricant will be drawn through these passages by centrifugal action, the amount of oil fed depending upon the speed of the engine, and will lubricate the outside surfaces of the valve and inside surface of the casing. For the purpose of lubricating the rings 14 between the sections of the valve, other branches 34 extend from the passage 32 through the reduced portions 13. The lubricant is thrown out against the rings 14, and lubricates the bearing surfaces of the rings and the sections of the valve. The lubricant also closes the joints and prevents escape of gas under pressure which may leak into the valve casing.

From the foregoing description, it will be apparent that through the absence of vibration in the valve and in the valve operating mechanism, there will be less wear and tear on the entire engine than with puppet valve engines, with the result of much smoother operation. The amount of lubricant for the lubrication of the valve is certain at all times, the amount of oil required being automatically delivered to all contact surfaces by the action of the valve itself by centrifugal action. From this it is apparent that the higher the speed of the engine, the greater amount of lubricant will be delivered to the valve. It will also be apparent that there are no springs in the valve, and hence one of the most unreliable features of the ordinary valve engine is avoided. It will also be apparent that by the location of the ports in the rotating valve above the center of the pistons, and in communication with the compression chambers, that the greater the pressure from compression or firing in the cylinder the tighter the ports will be closed. It is also apparent that, irrespective of the wear upon the valve or casing, a close joint will be provided. While we have not illustrated the usual connections of the engine, it is apparent that the gas inlet passage 19 of all the cylinders may be connected to the usual manifold, and those to a single carbureter, or each may be connected to a separate carbureter. It is also apparent that the exhaust passages from the valve casing 20 may be connected to manifolds in the usual manner. Any form of igniters may be employed, and they may be arranged in any place, the igniter 35 being simply located where shown for purposes of illustration. It is apparent that the gas and exhaust ports in the valve being separated by a considerable width of valve surface, there will be no leakage between the two.

In accordance with the provisions of the patent statutes, we have described the principle of our invention, together with the apparatus which we now consider to represent the best embodiment thereof; but we desire to have it understood that the apparatus shown is merely illustrative, and that the invention can be carried out in other ways.

Having now described our invention, what we claim as new and desire to secure by Letters Patent, is:—

1. An internal combustion engine having a rotating valve, ports communicating with the cylinder, a starting valve, an auxiliary port in the main valve communicating with the starting valve, said auxiliary port communicating with one of the valve ports.

2. An internal combustion engine having a rotating valve, with a port therein, communicating with a cylinder, a starting valve having a port therein, an auxiliary port in the main valve, and a by-pass connecting the auxiliary port with the main port of the valve, so that the starting valve port communicates with the main port when the valve is in a certain position.

3. An internal combustion engine having a plurality of cylinders, a rotating, floating valve having weakened sections between cylinders, and expanding rings at such weakened sections, said rings remaining stationary while the valve revolves.

4. An internal combustion engine having a rotating valve, a starting valve, said starting valve having ports therein communicating with the ports in the rotating valve, and other ports communicating with the cylinder, for controlling free air inlet and outlet to the cylinder direct.

This specification signed and witnessed this 23rd day of February, 1912.

JOHN THOMAS SIMPSON.
PERCY B. TAYLOR.

Witnesses:
JOHN B. WRIGHT,
JOHN L. LOTSCH.